United States Patent [19]

Mori et al.

[11] 3,731,941

[45] May 8, 1973

[54] FACING MATERIALS FOR AN INTERNAL COMBUSTION ENGINE CYLINDER AND A COOPERATING PISTON RING

[75] Inventors: Yoshio Mori, Tokyo; Yoshihito Sato, Kawaguchi; Kentaro Takahashi, Omiya, all of Japan

[73] Assignee: Nippon Piston Ring Kabushika Kaisha, Tokyo, Japan

[22] Filed: Dec. 1, 1971

[21] Appl. No.: 203,877

[30] Foreign Application Priority Data

Dec. 12, 1970 Japan ............................. 45/110109

[52] U.S. Cl. ............ 277/235 R, 123/193 CP, 277/96, 308/4, 418/179
[51] Int. Cl. ............................. F16j 9/12, F16j 15/08
[58] Field of Search .................. 277/235 B, 236, 216, 277/96, 237; 204/9; 418/179; 92/169, 222, 67, 84; 308/4; 123/193 C, 193 P, 193 CP

[56] References Cited

UNITED STATES PATENTS

| | | | |
|---|---|---|---|
| 1,449,615 | 3/1923 | McLeod | 277/216 |
| 3,464,707 | 9/1969 | Packard et al. | 277/235 |
| 3,658,451 | 4/1972 | Gomada | 277/236 |
| 3,199,929 | 8/1965 | McLean et al. | 308/4 |

FOREIGN PATENTS OR APPLICATIONS

| | | | |
|---|---|---|---|
| 409,579 | 5/1934 | Great Britain | 277/236 |

*Primary Examiner*—Joseph R. Leclair
*Assistant Examiner*—Robert I. Smith
*Attorney*—Kurt Kelman et al.

[57] ABSTRACT

Abrasion wear of piston rings and of the inner cylinder wall of an internal combustion engine is very low when the piston ring consists of cast iron of specified composition and a Rockwell hardness of at least C 40, and the cylinder wall consists of electrodeposited nickel having fine particles of silicon carbide or other very hard material dispersed therein so that the cylinder wall has a hardness of Rockwell A 70 – A 100.

7 Claims, No Drawings

FACING MATERIALS FOR AN INTERNAL COMBUSTION ENGINE CYLINDER AND A COOPERATING PISTON RING

This invention relates to a combination of materials in the face portions of two members of an apparatus which frictionally engage each other and are moved relative to each other in area contact, and particularly to facing materials for the inner cylinder wall of an internal combustion engine and for a piston ring reciprocated in the cylinder during engine operation.

With a trend toward increasing rotary speed and higher compression ratio in internal combustion engines, particularly gasoline engines for automotive vehicles, the wear resistance of piston rings and of the inner cylinder walls frictionally engaging the rings must be improved if long periods of operation between overhauls are desired. It has been common practice to electrodeposit chromium on one of the frictionally engaged face portions for reducing wear, but the improvement achieved thereby is limited so as not to be satisfactory under severe operating conditions.

It has now been found that a certain combination of materials for the face portions of an inner cylinder wall or cylinder liner and of a piston ring frictionally engaging the wall while being reciprocated by the piston in the cylinder suffers significantly less abrasive wear than the best combinations practically available heretofore.

According to the invention, one of the frictionally engaged face portions essentially consists of cast iron having a hardness of at least 40 on the Rockwell C scale and a particulate graphite content of 0.5 to 3 percent by weight in a martensite matrix, 10 to 45 percent of the area of a polished section of the cast iron consisting of cementite.

The other face portion essentially consists of electrolytically deposited nickel and pulverulent particles of a material much harder than the nickel and dispersed in the same.

The cast iron according to the invention has the following chemical composition, in percent by weight:

C 2.5 – 4.0
Si 1.5 – 3.0
Mo 0.1 – 1.0
Ni 0.1 – 1.0
Cr 0.1 – 1.0
Mn 0.3 – 1.5
Impurities including
S 0.1 max.
P abt. 0.1 max.
Fe Balance At a carbon content of less than 2.5 percent, an adequate amount of particulate graphite is not formed in the microstructure. At a carbon content higher than 4.0 percent, a stable carbide deposit cannot be expected. The required graphite content is not readily achieved with less than 1.5% Si, and the desired stable carbide phase is not readily formed with more than 3.0 percent silicon.

At least 0.1 percent molybdenum is needed for achieving the required high hardness, and at least 0.1 percent nickel for adequate strength. The cost of the cast iron becomes excessive with a molybdenum or nickel content of more than 1.0 percent.

A minimum of 0.1 percent chromium is needed for adequate carbide formation, and more than 1.0 percent chromium interferes with graphite formation. At least 0.5 percent graphite is needed as a solid lubricant, but more than 3.0 percent graphite makes the cast iron brittle.

The abrasion resistance of the cast iron is insufficient when the area percentage of the carbide (cementite) in a polished section is lower than 10 percent, and it is almost impossible to obtain a carbide area of more than 45 percent under the other conditions specified.

A minimum of 0.3 percent manganese is needed to hold the sulfur content within the necessary limits, while more manganese increases the carbide area to more than 45 percent in an undesirable manner. Incidental impurities, particularly sulfur and phosphorus, must be limited to prevent brittleness.

The desired and necessary hardness of the cast iron is achieved by chilling the liquid alloy in a mold at 1450°C and by thereafter holding it at 1000°C for 2 hours to graphitize enough carbide. These conditions are readily met in casting a piston ring, and may be modified in a known manner when it is desired to make the cylinder or cylinder liner of cast iron.

The other face portion is prepared in the manner described in Grazen U.S. Pat. No. 3,061,525, issued Oct. 30, 1962. Nickel is electrodeposited on a base of cast iron or other suitable conductive material, and fine particles of greater hardness are entrapped in the electrodeposit on which they may settle by gravity from the agitated electrolyte. Suitable hard substances known to be capable of being embedded in a nickel plate include oxides of aluminum or iron, carbides of silicon or tungsten, and diamond, but also finely dispersed hard metals such as tungsten, and mixtures of these materials. The amount of embedded hard particles may be controlled in a known manner by varying the agitation of the electrolyte, the particle size, the current density, and other process variables, as partly discussed in the afore-mentioned patent, and in greater detail in a more recent paper by Ruml [Metalloberflaeche 23 (1969) 2, 35-36]. The process is readily controlled to make the hardness of the reinforced nickel deposit 70 – 100 on the Rockwell A scale.

The composition of the electrolyte is not critical, but the following range of ingredients has been found to be controlled conveniently:

| | |
|---|---|
| $NiSO_4 \cdot 7H_2O$ | 150 – 300 grams/liter |
| $NiCl_2 \cdot 6H_2O$ | 30 – 70 grams/liter |
| $H_3BO_3$ | 20 – 40 grams/liter |

Silicon carbide, among the hard materials mentioned above, combines high hardness with low cost in a most desirable manner at this time and is the preferred pulverulent material held dispersed in the electrolyte by agitation in amounts of 10 to 100 g per liter at a particle size of 10 to 100 microns. The pH value of the electrolyte is chosen according to other process variables between 1 and 7 in a conventional manner. The temperature may be between ambient temperature and 70°C, and the current density between 10 and 100 amps./sq.ft. Electrolytic nickel is the preferred anode material.

The following example is further illustrative of this invention and of the results achieved thereby

EXAMPLE

Piston rings having dimensions of 74 × 1.5 × 3.4 mm were made of cast iron according to the invention consisting of C 3.12%, Si 2.05%, Mo 0.73%, Ni 0.55%, Cr 0.54%, Mn 0.68%, P 0.11%, S 0.05%, Fe balance, and having a Rockwell hardness of C 55.

For comparison purposes, piston rings of the same dimensions were made of conventional cast iron consisting of C 3.55%, Si 2.42%, Mn 0.70%, P 0.15%, S 0.08%, Fe balance, Rockwell B 98, and their circumferences were chromium plated to a thickness of 0.12 mm.

An air-cooled gasoline engine having a total displacement of 1298 cm$^3$ and developing 100 h.p. at 7200 r.p.m. was equipped with four cylinders of cast iron containing C 3.24%, Si 2.15%, Mn 0.57%, P 0.22%, S 0.07%, balance iron, having an effective bore of 74 mm and with pistons having a stroke of 75.5 mm and a maximum velocity of 18.1 m/sec.

Two of the cylinders were internally coated cathodically to the desired bore size from an electrolyte containing

| | |
|---|---|
| $NiSO_4.7H_2O$ | 235 g/liter |
| $NiCl_2.6H_2O$ | 54 g/liter |
| $H_3BO_{03}$ | 28 g/liter |
| SiC (30 $\mu$) | 30 g/liter | with sufficient agitation to keep the SiC particles almost completely in suspension at pH 5.8, 51.5°C, and 30 amps./sq.ft. for 30 minutes. The coating so produced had a thickness of 0.05 mm and a Rockwell hardness of C 62 (corresponding to A 82).

The piston rings of the invention were installed on the pistons reciprocating in the coated cylinders, whereas the chromium-plated rings were installed in the bare cast-iron cylinders. The engine was then operated continuously for an extended period.

The abrasion loss per 100 hours of engine operation was 5 microns on the conventionally surfaced cylinders, and 2 microns on the coated cylinders of the invention. It was 15 microns on the chromium plated piston rings and 5 microns on the uncoated cast iron rings of the invention. Analogous reductions in abrasion loss were observed at maximum piston speeds of 25 m/sec. and contact pressures of 100 kg/cm$^2$.

While the invention has been described with reference to a piston ring of hard cast iron cooperating with an internally nickel-plated cylinder, the materials of the face portions of the ring and cylinder may be interchanged in an obvious manner without substantial loss in wear resistance, and the invention is generally applicable to any pair of members having frictionally engaged face portions and moved relative to each other in area contact during normal operation of an apparatus, particularly where the speed of movement and the contact pressure are high.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the appended claims.

What is claimed is:

1. In an apparatus including two members having respective first and second face portions frictionally engaging each other, and means for moving the frictionally engaged face portions relative to each other in area contact, the improvement which comprises:
   1. said first face portion essentially consisting of cast iron having a hardness of at least 40 on the Rockwell C scale, and a particulate graphite content of 0.5 to 3 percent by weight in a martensite matrix, 10 to 45 percent of the area of a polished section of said cast iron consisting of cementite; and
   2. said second face portion essentially consisting of electrolytically deposited nickel and pulverulent particles of a material much harder than said nickel dispersed in the same.

2. In an apparatus as set forth in claim 1, one of said members being a piston ring in an internal combustion engine, and the other member constituting the inner wall of a cylinder receiving said piston ring therein.

3. In an apparatus as set forth in claim 2, said cast iron containing 2.5 – 4.0 percent carbon, 1.5 – 3.0 percent silicon, 0.1 – 1.0 percent molybdenum, 0.1 – 1.0 percent nickel, 0.1 – 1.0 percent chromium, 0.3 – 1.5 percent manganese, incidental impurities, the balance being iron, said impurities including not substantially more than 0.1 percent phosphorus nor more than 0.1 percent sulfur.

4. In an apparatus as set forth in claim 3, said material being an oxide of aluminum or iron, a carbide of silicon or tungsten or diamond.

5. In an apparatus as set forth in claim 4, the amount of said material in said second face portion being sufficient to make the hardness of said second face portion 70 – 100 on the Rockwell A scale.

6. In an apparatus as set forth in claim 5, the size of said particles being between 10 and 100 microns.

7. In an apparatus as set forth in claim 3, said first face portion being the face portion of said piston ring, and said material being silicon carbide.

* * * * *